(12) United States Patent
Rusz (10) Patent No.: US 9,921,043 B2
(45) Date of Patent: Mar. 20, 2018

(54) MEASUREMENT TOOL AND METHOD OF MEASURING BRAKE STROKE

(71) Applicant: ArvinMeritor Technology, LLC, Troy, MI (US)

(72) Inventor: Marcel Rusz, Farmington Hills, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 186 days.

(21) Appl. No.: 15/000,483

(22) Filed: Jan. 19, 2016

(65) Prior Publication Data
US 2017/0205219 A1 Jul. 20, 2017

(51) Int. Cl.
*G01B 5/00* (2006.01)
*G01L 5/28* (2006.01)
*B60T 7/18* (2006.01)
*B60T 17/22* (2006.01)

(52) U.S. Cl.
CPC .............. *G01B 5/0028* (2013.01); *B60T 7/18* (2013.01); *G01L 5/28* (2013.01); *B60T 17/221* (2013.01)

(58) Field of Classification Search
CPC ........ G01L 5/28; G01B 5/0028; B60T 17/221
See application file for complete search history.

(56) References Cited

U.S. PATENT DOCUMENTS

| 4,550,460 | A | * | 11/1985 | Smallbrook | ........ B25B 27/0035 7/164 |
| 4,612,656 | A | * | 9/1986 | Suzuki | .................. G01B 3/205 33/784 |
| 5,181,440 | A | * | 1/1993 | Jagt | ..................... B25B 27/0035 188/1.11 R |
| 7,040,151 | B2 | | 5/2006 | Graham et al. | |

OTHER PUBLICATIONS

Meritor Heavy Vehicle Systems, LLC, Maintenance Manual 4, Cam Brakes and Automatic Slack Adjusters, Supersedes Maintenance Manual 4B, Automatic Slack Adjusters, Revised Jan. 2005, Troy, Michigan, USA.
U.S. Appl. No. 14/340,800, filed Jul. 25, 2014.

* cited by examiner

*Primary Examiner* — Hezron E Williams
*Assistant Examiner* — David Z Huang
(74) *Attorney, Agent, or Firm* — Brooks Kushman P.C.

(57) ABSTRACT

A measurement tool and a method of measuring brake stroke of a brake assembly. The method may include installing the measurement tool on the brake assembly. An actuator shaft may be actuated with a lever tool. The measurement tool may measure the brake stroke when the actuator shaft is actuated.

17 Claims, 5 Drawing Sheets

MEASUREMENT TOOL AND METHOD OF MEASURING BRAKE STROKE

TECHNICAL FIELD

This disclosure relates to a measurement tool and a method of measuring brake stroke of a brake assembly.

BACKGROUND

A brake evaluation gauge is disclosed in U.S. Pat. No. 7,040,151.

SUMMARY

In at least one embodiment, a method of measuring brake stroke of a brake assembly is provided. The method may include installing a measurement tool on a brake actuator and on a clevis that is mounted to an actuator shaft of the brake actuator. The clevis may be actuated with a lever tool. The measurement tool may measure the brake stroke when the clevis is actuated.

In at least one embodiment, a method of measuring brake stroke of a brake assembly is provided. The method may include installing a measurement tool on the brake assembly. The measurement tool may have a measurement unit that may be movably disposed on a scale. The scale may be mounted proximate a housing of a brake actuator. The measurement unit may be mounted on a clevis that may be mounted to an actuator shaft of the brake actuator. The measurement tool may be initialized. The clevis may be actuated with a lever tool. The measurement tool may measure the brake stroke when the clevis is actuated.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figures 1, 2:
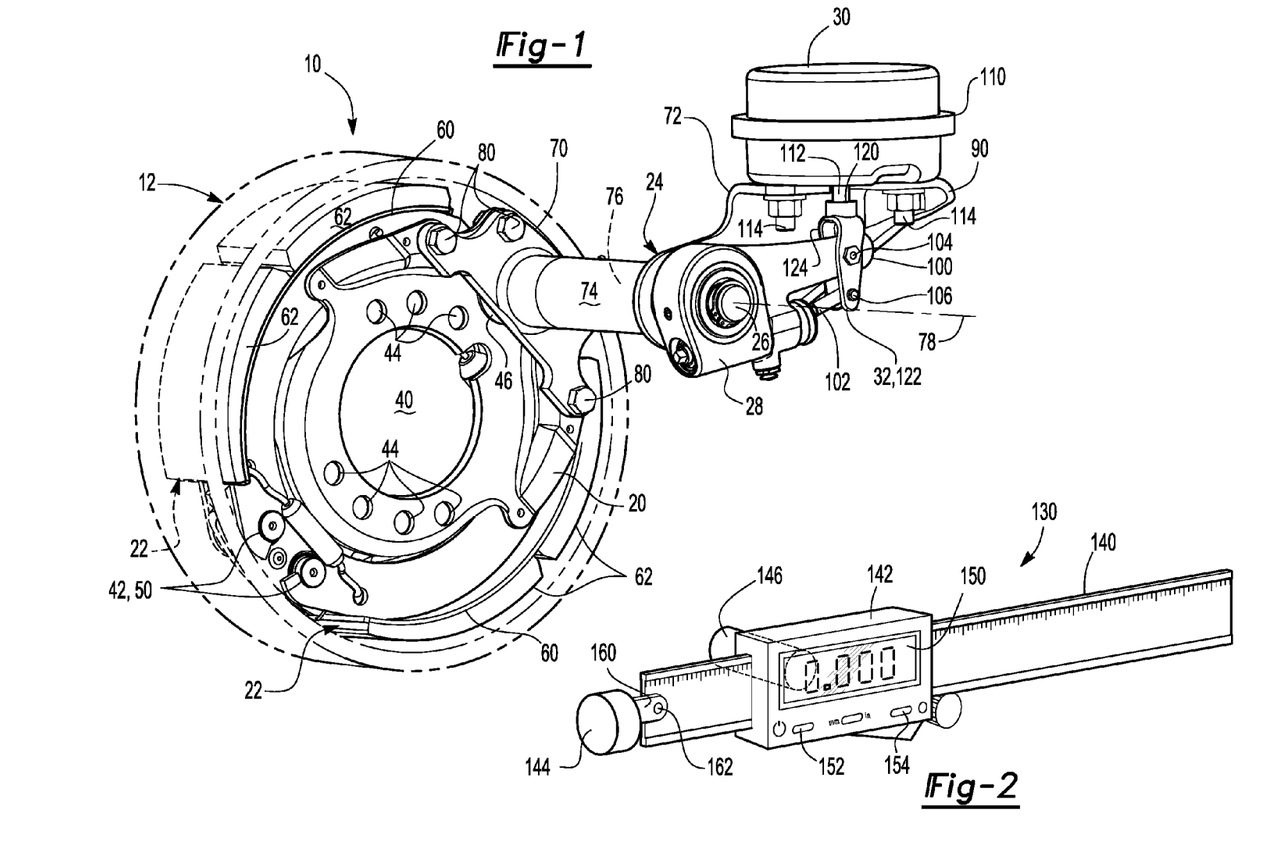
FIG. 1 is a perspective view of an exemplary brake assembly.
FIG. 2 is a perspective view of an exemplary measurement tool.

Referring to FIG. 1, an exemplary brake assembly 10 is shown. The brake assembly 10 may be provided with a vehicle, such as a motor vehicle like a truck, bus, farm equipment, mining equipment, military transport or weaponry vehicle, or cargo loading equipment for land, air, or marine vessels. In addition, the brake assembly 10 may be provided on a trailer that may be coupled to or provided with a motor vehicle.

The brake assembly 10 may be a friction brake that may be configured to slow or inhibit rotation of at least one associated wheel. In FIG. 1, the brake assembly 10 is depicted as a drum brake. In a drum brake configuration, a brake drum 12 may extend continuously around brake pad assemblies that may be actuated to engage the brake drum 12 and slow the rotation of a wheel. The brake drum 12, which is outlined in phantom lines in FIG. 1 to more clearly show other components of the brake assembly 10, may be disposed between a wheel and a wheel hub assembly that may rotatably support the wheel. In at least one embodiment, the brake assembly 10 may include a spider 20, at least one brake pad assembly 22, a bracket assembly 24, a camshaft 26, a slack adjuster 28, an actuator 30, and a clevis 32.

The spider 20 may support various components of the brake assembly 10. In addition, the spider 20 may facilitate mounting of the brake assembly 10 to the vehicle. For example, the spider 20 may be fixedly disposed on or fixedly positioned with respect to an axle assembly or a steering knuckle. In at least one embodiment, the spider 20 may include a hole 40 through which an axle and/or a spindle may extend. For instance, an axle or a spindle may extend through the hole 40 and may support one or more wheel bearings that may support and facilitate rotation of a wheel assembly. The spider 20 may also include one or more anchor pin holes 42, one or more spider mounting holes 44, and a camshaft opening 46.

The anchor pin hole 42 may receive an anchor pin 50 that may facilitate mounting and operation of a brake pad assembly 22 will be discussed in more detail below. In FIG. 1, two anchor pin holes 42 are provided that are generally disposed on an opposite side of the hole 40 from the bracket assembly 24. Each anchor pin hole 42 may receive a different anchor pin 50 and each anchor pin 50 may support a different brake pad assembly 22. It is also contemplated that an anchor pin 50 could support multiple brake pad assemblies.

A spider mounting hole 44 may facilitate mounting of the spider 20 to the vehicle. In FIG. 1, a plurality of spider mounting holes 44 are arranged around the hole 40. Each spider mounting hole 44 may receive a fastener, such as a bolt, that may extend through the spider mounting hole 44 and couple the spider 20 to another component, such as an axle assembly or a steering knuckle.

The camshaft opening 46 may receive the camshaft 26 and optionally a portion of the bracket assembly 24. The camshaft 26 may extend through the camshaft opening 46 to engage one or more brake pad assemblies 22.

One or more brake pad assemblies 22 may be disposed proximate the spider 20. In FIG. 1, two brake pad assemblies 22 are shown that are generally disposed opposite each other. The brake pad assembly 22 may include a brake shoe 60 and a friction material 62.

The brake shoe 60 may be a structural member of a brake pad assembly 22. The brake shoe 60 may be pivotally mounted to the spider 20 at a first end via the anchor pin 50. For example, the anchor pin 50 may be fixedly positioned with respect to the spider 20 and the brake shoe 60 may pivot about an outer surface or outside circumference of the anchor pin 50 when the brake pad assembly 22 is actuated.

An opposite end of the brake shoe 60 may be disposed on a cam roller that may be configured to engage a cam or S-cam of the camshaft 26.

The friction material 62, which may also be called a brake lining, may be disposed on an outer surface of the brake shoe 60 and may face toward the brake drum 12. The friction material 62 may engage the brake drum 12 during vehicle braking or when the brake pad assembly 22 is actuated and extended and may be spaced apart from the brake drum 12 when friction braking is not being applied or when the brake pad assembly 22 is retracted.

The bracket assembly 24 may facilitate mounting of the camshaft 26, the slack adjuster 28, and the actuator 30. The bracket assembly 24 may include a mounting flange 70, a brake wing 72, and a camshaft tube 74. In at least one embodiment, the mounting flange 70, brake wing 72, and camshaft tube 74 may be provided as separate components. It is also contemplated that the mounting flange 70 may be integrally formed with the camshaft tube 74 or the brake wing 72 may be integrally formed with the camshaft tube 74, thereby resulting in a two piece bracket assembly or alternatively a one piece bracket assembly. The bracket assembly 24 may have a hole 76 that may receive the camshaft 26. The hole 76 may be a through hole that may extend through the bracket assembly 24. The hole 76 may extend along an axis 78 and may be defined by the camshaft tube 74 and optionally by hole portions in the mounting flange 70 and/or the brake wing 72.

The mounting flange 70 may facilitate mounting of the bracket assembly 24 to the spider 20. For example, the mounting flange 70 may have one or more mounting holes that may receive a fastener 80, such as a bolt, that may couple the mounting flange 70 to the spider 20. The mounting flange 70 may be spaced apart from the brake wing 72 and may be fixedly positioned on the camshaft tube 74 near or at an end of the camshaft tube 74.

The brake wing 72 may be coupled to the camshaft tube 74 and may support the actuator 30. The brake wing 72 may be spaced apart from the spider 20 and may be fixedly coupled to the camshaft tube 74 opposite the mounting flange 70. In at least one embodiment, the brake wing 72 may have a generally L-shaped cross section and may have an actuator mounting portion 90 that may support and facilitate mounting of the actuator 30. For instance, the actuator mounting portion 90 may have one or more actuator mounting holes 92 and an actuator shaft opening 94. Each actuator mounting hole 92 may receive a fastener, such as a mounting stud of the actuator 30 to facilitate mounting of the actuator 30 to the brake wing 72. The actuator shaft opening 94 may be disposed between the actuator mounting holes 92 and may receive an actuator shaft of the actuator 30.

The camshaft tube 74 may extend from the mounting flange 70 to the brake wing 72. The camshaft tube 74 may have a generally hollow tubular configuration that may extend along the axis 78 and may define at least a portion of the hole 76 through which the camshaft 26 may extend.

The camshaft 26 may be configured to actuate the brake pad assemblies 22. The camshaft 26 may extend along and may rotate about the axis 78. The camshaft 26 may extend through the camshaft opening 46 in the spider 20 and the hole 76 in the bracket assembly 24. The camshaft 26 may include a cam disposed at a first end. The cam may be an S-cam and may be configured to engage the cam roller on the brake shoe 60. Rotation of the camshaft 26 may actuate the brake pad assemblies 22 such that the friction material 62 moves toward or engages an inner surface of the brake drum 12 to brake or slow or inhibit rotation of an associated wheel.

The camshaft 26 may also include a second end that is disposed opposite the first end. The second end of the camshaft 26 may be disposed proximate the slack adjuster 28 and may engage the slack adjuster 28.

The slack adjuster 28 may be provided to compensate for brake wear or wear of the friction material 62. The slack adjuster 28 may be fixedly disposed near the second end of the camshaft 26. For example, the slack adjuster 28 may have a mounting hole that may receive the camshaft 26. The slack adjuster 28 may be coupled to the camshaft 26 in any suitable manner. For instance, the mounting hole of the slack adjuster 28 and the camshaft 26 may have mating splines that may help couple the slack adjuster 28 and a camshaft 26 together. The slack adjuster 28 may have a mounting arm 100 and an adjustment rod 102.

Figure 4:
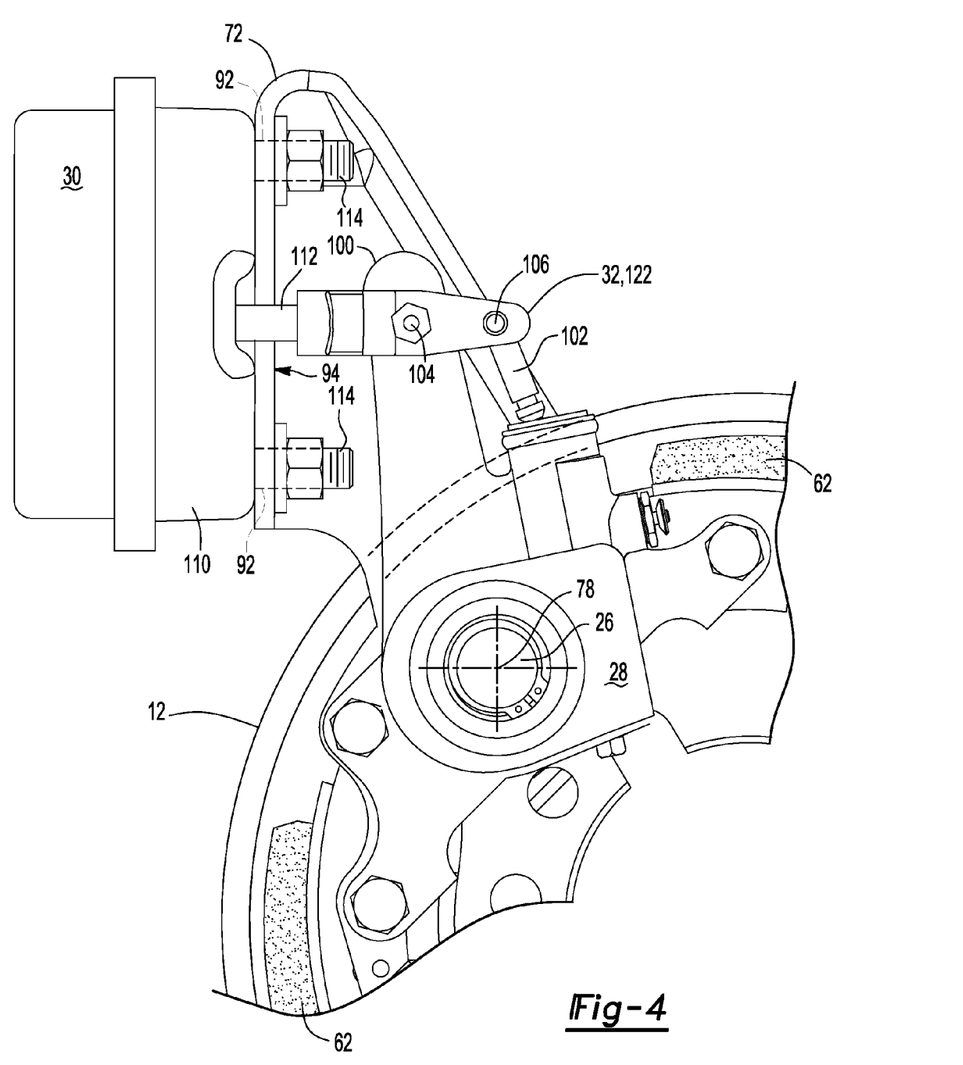
FIG. 4 is a side view of a portion of the brake assembly in a retracted position.

Referring to FIGS. 1 and 4, the mounting arm 100 may facilitate mounting of the slack adjuster 28 to the clevis 32. For instance, the mounting arm 100 may be integrally formed with the slack adjuster 28 and may be disposed closer to the actuator 30 than the adjustment rod 102. The mounting arm 100 may be attached to or mounted to the clevis 32 with a first attachment feature 104. The first attachment feature 104 may have any suitable configuration. For example, the first attachment feature 104 may be a fastener, such as a pin or a bolt. The first attachment feature 104 may allow the mounting arm 100 to pivot or rotate with respect to the clevis 32.

The adjustment rod 102 may be spaced apart from the mounting arm 100 and may be disposed near an end of the clevis 32. The adjustment rod 102 may pivot with respect to the body of the slack adjuster 28 and the mounting arm 100 and may be lengthened or shortened with an adjustment screw. For instance, rotating the adjustment screw may lengthen or shorten the adjustment rod 102 which in turn may adjust the rotational position of the slack adjuster 28 and hence the position of the camshaft 26 and brake pad assemblies 22 about the axis 78. The adjustment rod 102 may be attached to or mounted to the clevis 32 with a second attachment feature 106. The second attachment feature 106 may have any suitable configuration. For example, the second attachment feature 106 may be a fastener, such as a pin or a bolt. The second attachment feature 106 may allow the adjustment rod 102 to pivot or rotate with respect to the clevis 32. The first attachment feature 104 may be disposed closer to the actuator 30 and its actuator shaft than the second attachment feature 106.

The actuator 30 may be provided to actuate the camshaft 26 and the brake pad assemblies 22. The actuator 30 may be of any suitable type, such as a pneumatic, hydraulic, electrical, or electromechanical actuator. In at least one embodiment, the actuator 30 may include a housing 110 and an actuator shaft 112.

The housing 110 may receive components of the actuator 30. The housing 110 may be fixedly disposed on a component of the brake assembly 10, such as the brake wing 72. For example, one or more mounting features 114, such as threaded mounting studs, may extend from the housing 110 and through a corresponding actuator mounting hole 92 in the brake wing 72. A mounting feature 114 may receive a washer and a nut to fixedly couple the actuator 30 to the brake wing 72.

The actuator shaft 112 may extend from the housing 110 to the slack adjuster 28. For example, the actuator shaft 112 may extend through the actuator shaft opening 94 in the brake wing 72 as is best shown in FIG. 4. The actuator 30 or actuator shaft 112 may move between a retracted position and an extended position. In the retracted position, the camshaft 26 may be positioned such that a brake pad assembly 22 does not engage the brake drum 12 to brake or inhibit rotation of an associated vehicle wheel assembly. In the extended position, the camshaft 26 may rotate about the axis 78 and may be positioned such that a brake pad assembly 22 moves toward and engages the brake drum 12 to inhibit rotation of an associated wheel hub assembly.

Referring to FIGS. 1 and 4, the clevis 32 may be mounted to the actuator shaft 112. The clevis 32 may have a generally U-shaped configuration that may include an actuator shaft mounting hole 120, a first arm 122, and a second arm 124.

The actuator shaft mounting hole 120 may be disposed between the first arm 122 and the second arm 124. The actuator shaft mounting hole 120 may receive the actuator shaft 112.

The first arm 122 and the second arm 124 may extend away from the actuator shaft mounting hole 120. The first arm 122 and the second arm 124 may facilitate mounting of the slack adjuster 28. For instance, the first arm 122 and the second arm 124 may have holes that may be aligned and may cooperate to receive the first attachment feature 104. The first arm 122 and the second arm 124 may also have additional holes that may be aligned and may cooperate to receive the second attachment feature 106.

Referring to FIG. 2, a measurement tool 130 for measuring brake stroke of the brake assembly is shown. The brake stroke, which may also be referred to as the free stroke, may be indicative of the clearance between the friction material 62 of a brake pad assembly 22 and the brake drum 12 or distance the brake pad assembly 22 moves when the brake assembly 10 is actuated from the retracted position to the extended position. In at least one embodiment, the measurement tool 130 may include a scale 140, a measurement unit 142, a first magnet 144, and a second magnet 146.

The scale 140 may support components of the measurement tool 130. The scale 140 may be configured as a rod or ruler in one or more embodiments.

The measurement unit 142 may be moveably disposed on the scale 140. For example, the measurement unit 142 may have a slot through which the scale 140 may extend. The measurement unit 142 may detect movement of the scale 140 with respect to the measurement unit 142. The measurement unit 142 may be analog or digital. In a digital configuration, the measurement unit 142 may include a sensor for detecting movement of the scale 140 as well as other components such as a battery, a microprocessor, a display 150, and one or more control buttons, such as a power button 152 and a reset or zero button 154.

The display 150 may display the distance measured by the measurement tool 130 or distance the scale 140 moves relative to the sensor. As such, the display 150 may display the brake stroke measured by the measurement tool 130.

The power button 152 may be actuated to turn on or turn off the measurement unit 142.

The zero button 154 may be pressed to "zero" the measurement unit 142 prior to measuring an actuation distance of the scale 140 with respect to the measurement unit 142.

The first magnet 144 may be disposed at an end of the scale 140. For example, the first magnet 144 may be pivotally disposed on the scale 140 in any suitable manner, such as with a linkage 160 and a pivot pin 162. Such a pivotal connection may allow the scale 140 to pivot or rotate relative to the first magnet 144 and linkage 160, may help maintain alignment of the scale 140 to the actuator shaft 112, and may help facilitate free movement of the measurement unit 142 along the scale 140.

The second magnet 146 may be fixedly disposed on the measurement unit 142. For example, the second magnet 146 may be disposed on the measurement unit 142 opposite the display 150 in any suitable manner, such as with an adhesive or fastener.

Figure 5:
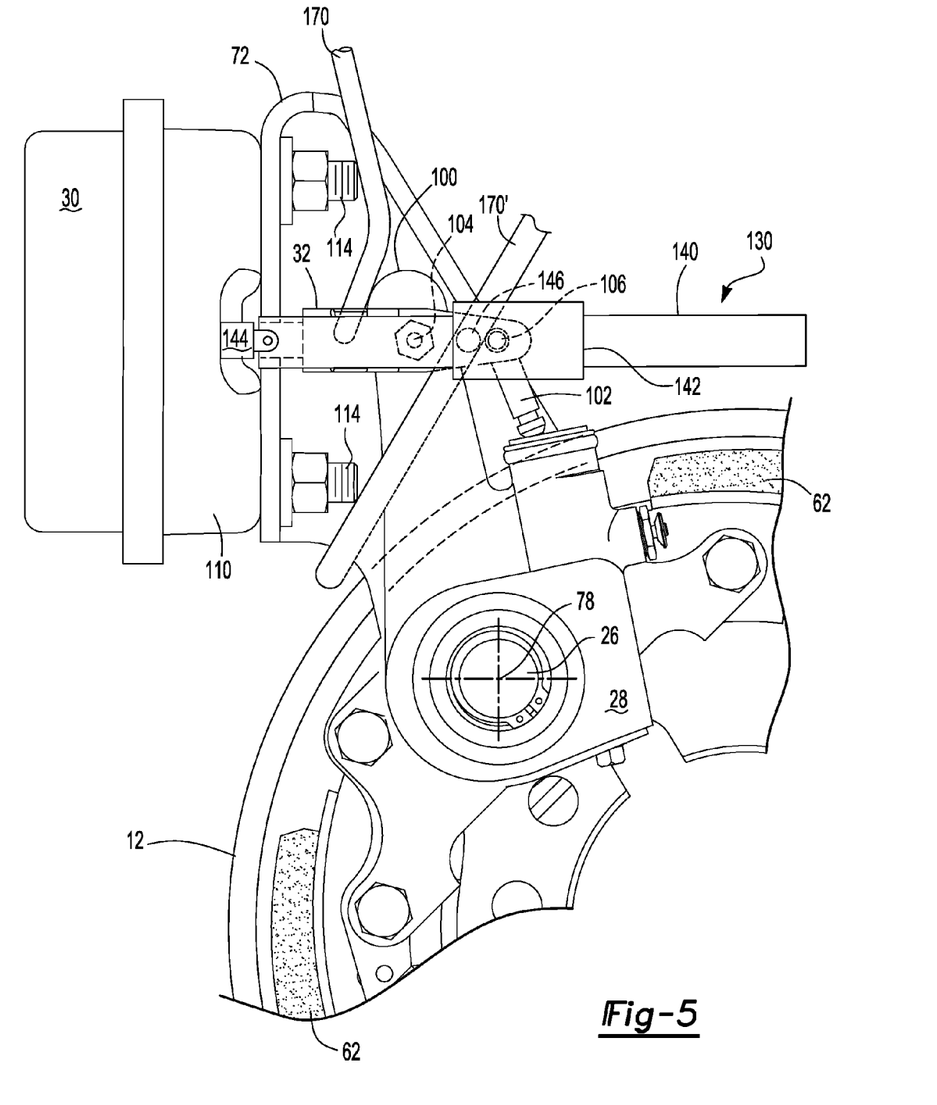
FIG. 5 is a side view of the brake assembly in the retracted position with the measurement tool installed on the brake assembly and a lever tool positioned for actuating the brake assembly.
Figure 6:
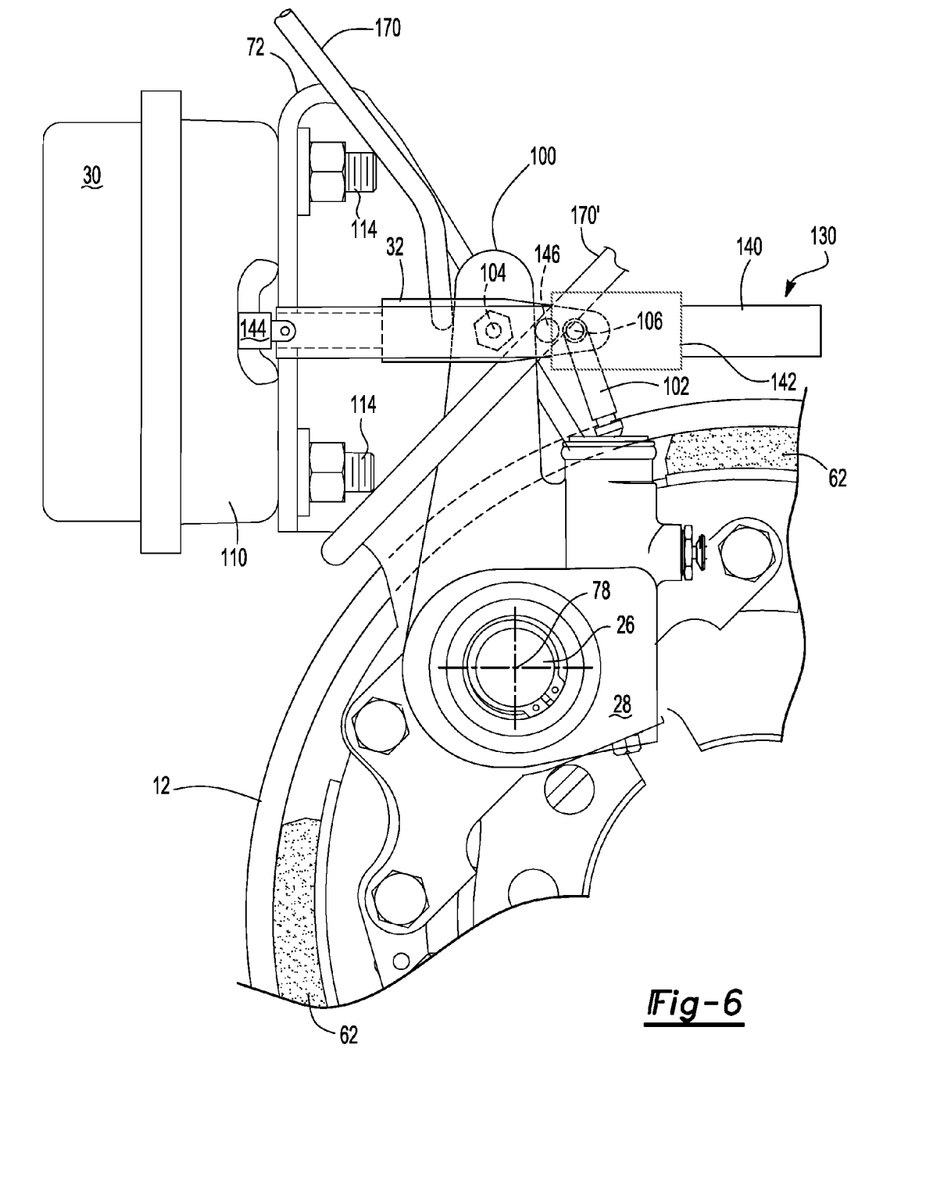
FIG. 6 is a side view of the brake assembly in an extended position with the measurement tool installed and the lever tool applying force to actuate the brake assembly.

Referring to FIGS. 3-6, a method of measuring brake stroke of a brake assembly will now be described. Steps associated with the method are shown in the flowchart in FIG. 3 and are illustrated in FIGS. 4-6.

At block 200, the measurement tool 130 may be installed on the brake assembly 10. The measurement tool 130 may be installed on the brake assembly 10 when the brake assembly 10 is in an initial position, such as the retracted position. In FIG. 4, the brake assembly 10 is shown in the retracted position without the measurement tool 130. In FIG. 5, the brake assembly 10 is shown in the retracted position with the measurement tool 130. In the retracted position, the actuator shaft 112 of the actuator 30 may not be extended and the brake pad assemblies 22 may not engage the brake drum 12 as previously discussed. As such, the slack adjuster 28 may be disposed in a nominal rotational position with respect to the axis 78 and the friction material 62 of the brake pad assemblies 22 may be spaced apart from the brake drum 12.

The measurement tool 130 may be installed on the brake assembly 10 the first magnet 144 and the second magnet 146. The first magnet 144 may be magnetically attached to a stationary component, such as the housing 110 of the actuator 30 or the brake wing 72. The second magnet 146 may be magnetically attached to the clevis 32. For example, the second magnet 146 may be magnetically attached to an arm of the clevis 32 between the first attachment feature 104 and the second attachment feature 106. In addition, the scale 140 may be positioned such that it may extend substantially parallel to the actuator shaft 112 or an axis along which the actuator shaft 112 may move. Once installed on the brake assembly 10, the measurement tool 130 may be stationary until an external actuation force is provided.

Figure 3:
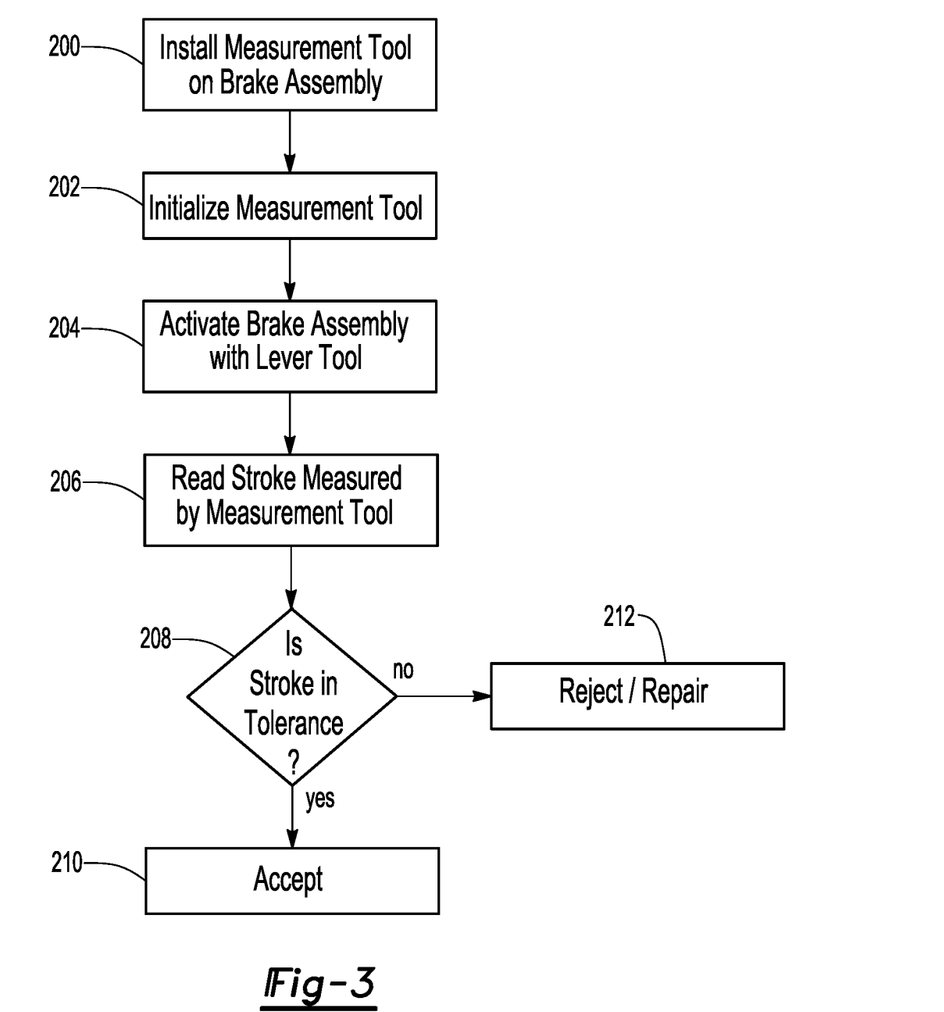
FIG. 3 is a flowchart of a method of measuring brake stroke.

At block 202, the measurement tool 130 may be initialized. The measurement tool 130 may be initialized by turning on the measurement unit 142 (if the measurement tool 130 has an electronic configuration) and by zeroing the measurement unit 142, either manually or with the zero button 154 as previously described. The display 150 may show a zero reading after the zero button 154 is pressed.

At 204, the brake assembly may be actuated with a lever tool 170 or 170'. Such actuation is best shown by comparing FIG. 5 to FIG. 6. The lever tool 170, 170' may be a pry bar or other suitable lever that may apply an actuation force to move the clevis 32 and associated components, such as the actuator shaft 112, slack adjuster 28, camshaft 26, and brake pad assemblies 22.

As such, the lever tool 170, 170' may be separate from the brake assembly 10 and may be manually actuated to apply or exert force to actuate the brake assembly 10 from the retracted position to the extended position.

In FIGS. 5 and 6, two lever tools 170, 170' or lever tool positions are shown. For instance, the lever tools 170, 170' may have the same configuration and different force application positions or different configurations and different force application positions. Regardless of the configuration or positioning of a lever tool, a lever tool 170, 170' may be inserted through the clevis 32 between the first arm 122 and the second arm 124. Lever tool 170 may be positioned between the mounting arm 100 of the slack adjuster 28 and the end of the clevis 32 having the actuator shaft 112 or actuator shaft mounting hole 120. As such, the lever tool 170 may engage the side of the mounting arm 100 that faces toward the actuator 30. As another example, lever tool 170' may be positioned between first attachment feature 104 and the second attachment feature 106 and may apply force against the second attachment feature 106. If the clevis 32 is sufficiently wide, a portion of the lever tool 170' may extend through the clevis 32 and may engage a portion of the actuator 30, such as in actuator mounting feature 114 or the brake wing 72.

The lever tool 170, 170' then may be moved or pivoted to exert force. Such force may be directly exerted on the clevis 32 or indirectly exerted on the clevis 32, such as by applying force against another component. For instance, lever tool 170 may engage and exert force against the mounting arm 100 of the slack adjuster 28 to actuate the clevis 32 and actuator shaft 112 away from the housing 110 of the actuator 30. As another example, lever tool 170' may engage and exert force against the second attachment feature 106 to actuate the clevis 32 and actuator shaft 112 away from the housing 110 of the actuator 30. Force exerted on the lever tool 170, 170' may actuate the actuator shaft 112 and clevis 32 with respect to the brake wing 72 and/or housing 110, and rotate the slack adjuster 28 and camshaft 26 about the axis 78 until at least one brake pad assembly 22 engages the brake drum 12, thereby resulting in measurement of the brake stroke. Such movement of the actuator shaft 112 and the clevis 32 may move the measurement unit 142 along the scale 140 and away from the actuator 30. Accordingly, the brake stroke measured by the measurement tool 130 may be indicative of the clearance between a brake pad assembly 22 and the brake drum 12 when the brake assembly is in the retracted position. The actuation distance of the measurement unit 142 along the scale 140 or brake stroke may be detected by the measurement unit 142 and displayed on the display 150.

At block 206, the brake stroke measured by the measurement tool 130 may be manually read by an operator or may be electronically read or electronically communicated to an electronic control system, such as a microprocessor-based controller or control module that may be in communication with the measurement tool 130. The measurement tool 130 may be removed at any point after the brake stroke is measured.

At block 208, the brake stroke may be compared to a brake stroke tolerance. The brake stroke tolerance may be a predetermined value or range that may be based on the size, configuration, or engineering specifications associated with the brake assembly 10. If the brake stroke is within the brake stroke tolerance, then the method may continue at block 210. If the brake stroke is not within the brake stroke tolerance, then the method may continue at block 212.

At block 210, the brake assembly may be accepted when the brake stroke is within the brake stroke tolerance.

At block 212, the brake assembly may be rejected when the measured brake stroke is not within the brake stroke tolerance. As such, the rejected brake assembly may undergo analysis and repair.

The measurement tool and method described above may allow brake stroke to be measured more accurately than with a tape measure or other linear measurement device. In addition, the measurement tool may accommodate different brake assembly configurations and different associated brake stroke distances.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of measuring brake stroke of a brake assembly, the method comprising:
   installing a measurement tool proximate a brake actuator and on a clevis that is mounted to an actuator shaft of the brake actuator, wherein the measurement tool has a scale, a first magnet that is pivotally disposed at an end of the scale and that couples the scale to the brake assembly, a measurement unit that is moveably disposed on the scale, and a second magnet that is disposed on the measurement unit, wherein the second magnet is magnetically attached to the clevis;
   actuating the clevis; and
   measuring a brake stroke with the measurement tool when the clevis is actuated.

2. The method of claim 1 further comprising comparing the brake stroke to a brake stroke tolerance.

3. The method of claim 2 further comprising accepting the brake assembly when the brake stroke is within the brake stroke tolerance.

4. The method of claim 2 further comprising rejecting the brake assembly when the brake stroke is not within the brake stroke tolerance.

5. The method of claim 1 wherein the scale is fixedly positioned with respect to the brake actuator.

6. The method of claim 5 further comprising initializing the measurement tool before actuating the clevis.

7. The method of claim 6 wherein initializing the measurement tool includes zeroing the measurement unit after the scale is mounted on the brake actuator and the measurement unit is mounted on the clevis.

8. The method of claim 1 wherein the brake stroke measured by the measurement tool is indicative of a clearance between a brake pad assembly and a brake drum.

9. The method of claim 1 wherein the clevis is actuated with a lever tool until a brake pad assembly of the brake assembly engages a brake drum.

10. A method of measuring brake stroke of a brake assembly, the method comprising:
    installing a measurement tool on the brake assembly, wherein the measurement tool has a measurement unit that is moveably disposed on a scale, a first magnet that is pivotally disposed at an end of the scale and couples the scale to the brake assembly, and a second magnet that is disposed on the measurement unit, wherein the scale is mounted proximate a housing of a brake actuator and the measurement unit is mounted on a clevis that is mounted to an actuator shaft of the brake actuator, wherein the second magnet is magnetically attached to the clevis;
    initializing the measurement tool;
    actuating the clevis with a lever tool that is at least partially received inside the clevis; and
    measuring a brake stroke with the measurement tool.

11. The method of claim 10 further comprising a slack adjuster having a mounting arm that is mounted to the clevis with a first attachment feature and an adjustment rod that is mounted to the clevis with a second attachment feature, wherein the lever tool is disposed between the first attachment feature and the second attachment feature.

12. A method of measuring brake stroke of a brake assembly, the method comprising:

installing a measurement tool on the brake assembly, wherein the measurement tool has a measurement unit that is moveably disposed on a scale, and the scale is mounted proximate a housing of a brake actuator and the measurement unit is mounted on a clevis that is mounted to an actuator shaft of the brake actuator, wherein the measurement tool has a first magnet that is disposed at an end of the scale and is magnetically attached to the brake actuator, a second magnet that is disposed on the measurement unit and is magnetically attached to the clevis between a first attachment feature and a second attachment feature, wherein a slack adjuster having a mounting arm is mounted to the clevis with the first attachment feature and an adjustment rod is mounted to the clevis with the second attachment feature;

initializing the measurement tool;

actuating the clevis with a lever tool; and measuring a brake stroke with the measurement tool.

13. The method of claim 12 wherein the first attachment feature is disposed closer to the actuator shaft than the second attachment feature.

14. The method of claim 12 wherein the second magnet is fixedly disposed on the measurement unit opposite a display that displays the brake stroke measured by the measurement tool.

15. The method of claim 12 wherein actuating the clevis with the lever tool includes inserting the lever tool through the clevis and applying force with the lever tool to actuate the clevis and actuator shaft with respect to an actuator housing of the actuator.

16. The method of claim 15 wherein force is manually applied with the lever tool.

17. The method of claim 15 wherein a portion of the lever tool engages the actuator when force is applied with the lever tool.

\* \* \* \* \*